United States Patent
Pautis et al.

(10) Patent No.: US 6,883,755 B2
(45) Date of Patent: Apr. 26, 2005

(54) AIRCRAFT COCKPIT WINDOW

(75) Inventors: Olivier Pautis, Toulouse (FR); Francis Dazet, Saint-Albau (FR); Pascal Chaumel, Plaisance du Tonch (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/722,020

(22) Filed: Nov. 24, 2003

(65) Prior Publication Data

US 2004/0104306 A1 Jun. 3, 2004

(30) Foreign Application Priority Data

Nov. 27, 2002 (FR) ............................................ 02 14880

(51) Int. Cl.[7] ................................................ B64C 1/14
(52) U.S. Cl. ................................ 244/129.3; 244/129.5; 296/115
(58) Field of Search ........................... 244/129.5, 129.1, 244/129.3, 121; 296/115, 155; 292/DIG. 31, DIG. 71, 217, 223, 113, 336.3; 16/95 R; 70/144; 49/215

(56) References Cited

U.S. PATENT DOCUMENTS

| | | | | |
|---|---|---|---|---|
| 2,493,904 A | * | 1/1950 | Ulrich et al. ................ | 244/121 |
| 2,538,434 A | * | 1/1951 | Svendsen ..................... | 16/95 R |
| 2,544,397 A | * | 3/1951 | Santucci et al. ............. | 244/121 |
| 3,045,464 A | * | 7/1962 | Braginetz ..................... | 70/144 |
| 3,050,790 A | * | 8/1962 | Wakefield ..................... | 49/215 |
| 3,544,148 A | * | 12/1970 | Sandor ..................... | 292/336.3 |
| 5,620,212 A | * | 4/1997 | Bourne et al. .............. | 292/113 |
| 5,769,361 A | * | 6/1998 | Charieras et al. ........ | 244/129.4 |
| 5,967,595 A | * | 10/1999 | Heya et al. .................. | 296/155 |

FOREIGN PATENT DOCUMENTS

| | | |
|---|---|---|
| EP | 241 245 | 4/1987 |
| EP | 0410886 | 1/1991 |
| EP | 0 521 717 A3 | 7/1992 |
| EP | 0 521 717 A2 | 7/1992 |
| EP | 0 673 820 | 3/1995 |
| FR | 879 567 | 11/1942 |

OTHER PUBLICATIONS

Coy of Preliminary Search Report by the French Patent Office on the priority French application.

* cited by examiner

*Primary Examiner*—Galen Barefoot
(74) *Attorney, Agent, or Firm*—Thelen Reid & Priest, LLP

(57) ABSTRACT

An aircraft cockpit window comprises a window pane (12) fitted with a frame (14), and guide rails (16, 18) on which the frame (14) is guided at three points (A, B, C) using two lower sets of rollers (20, 22) and an upper set of rollers (24). All these controls for locking/unlocking and opening the window pane are grouped on a handle (26) articulated on the lower edge of the frame (14), about an axis (28) that is preferably approximately vertical.

16 Claims, 7 Drawing Sheets

AIRCRAFT COCKPIT WINDOW

CROSS-REFERENCE TO RELATED APPLICATION

This application claims priority to French application no. 02 14880, filed on Nov. 27, 2002, entitled: "Aircraft Cockpit Window" and was not published in English.

1. Technical Domain

This invention relates to a window for use in an aircraft cockpit.

More precisely, the invention relates to an aircraft cockpit side window designed so that it can be operated by a human operator such as the pilot without the need for any other energy source, despite forces applied to the said window due to the pressure differential between the inside and outside of the aircraft.

2. State of Prior Art

On existing aircraft in the "AIRBUS" family, each cockpit side window comprises a glass pane that is usually connected to the cockpit structure at four points. Two of these points are located near the bottom and the other two points are located near the top. These points are materialised by rollers that slide in top and bottom rails that are parallel to each other.

This conventional assembly is satisfactory for aircraft with windows with relatively simple shapes and relatively small dimensions. On the other hand, it cannot be used in windows with complex shapes, for example that cannot be developed, since it is statically indeterminate. The glass pane in this type of window can deform non-uniformly when stresses are applied to it, particularly for a large window. Therefore, it is a good idea to use a statically determinate assembly on the aircraft structure for this type of window.

Document U.S. Pat. No. 3,050,790 describes an aircraft cockpit side window in which the window frame is connected to the aircraft structure at three points forming a statically determinate connection. When the window is opened, the first step is to pull the back part of the frame clear before sliding the frame backwards.

However, this known window has a number of disadvantages.

Thus, the mechanism for opening and closing the window pane is incapable of locking the window frame in the open or partly open position. Therefore, there is a risk that the window pane should move in translation in its rails, for example when the aircraft brakes are applied on the runway. An operator looking outside the open window might then be injured if the translation movement takes place in the forward direction.

Another disadvantage of this known mechanism is that when the window is closed, the front part of the window frame enters the cockpit structure along a movement that causes friction on the seals. This causes premature wear of the seals.

Furthermore, in order to offer good ergonomy to the operator, it is desirable that the operator should be able to carry out all manoeuvres on the window using a single device such as a handle equipped with all means necessary to move the window pane and to secure it in its different positions. It is also desirable for this device to be easily accessible at all positions.

Connections between the window pane and the rails forming the cockpit structure are conventionally made with clearances sufficient to absorb deformations of the window pane particularly due to variations in the pressure difference between the inside and outside of the aircraft. However, in order to achieve air tightness and watertightness, these clearances must remain below predetermined values for which the order of magnitude is usually about 1 millimeter. The result is that rails can be subjected to stresses that could damage them (appearance of cracks, etc.).

PRESENTATION OF THE INVENTION

The purpose of the invention is specifically an aircraft cockpit window with an innovative design by which it can solve at least some of the problems that arise with windows according to prior art.

More precisely, the purpose of the invention is an aircraft cockpit window that in particular allows a statically determinate assembly of the window pane on the aircraft structure and holds the window pane in the open or semi-closed position.

According to the invention, this result is achieved using an aircraft window comprising a cockpit structure, a window pane provided with a rigid frame, three-point guide means for guiding the frame with respect to the cockpit structure, means of locking/unlocking the frame with respect to the cockpit structure and a control device to control displacement of the window pane with respect to the cockpit structure when the locking/unlocking means are in an unlocked state, characterised in that the locking/unlocking means comprise an unlocking device supported on the control device.

This innovative arrangement enables a statically determinate assembly of the window pane on the cockpit structure and control of locking and unlocking of the window pane and all its movements by actuating a single control device. Therefore, ergonomy is better than in cockpit windows according to prior art.

In one preferred embodiment of the invention, the control device is a handle articulated on the frame and the unlocking device is a button placed on the handle and elastically returned to a locking position.

Advantageously, the handle is then articulated on the frame by an approximately vertical axis.

Also advantageously, the handle is free to pivot backwards on the rigid frame starting from a position in contact with the window pane.

In another preferred embodiment of the invention, there is an unlocking indicator device placed on the handle. More precisely, this device is mechanically connected to the button so that it projects outwards and is clearly visible when the button is in the unlocking position.

Preferably, the guide means comprise a top rail and a bottom rail belonging to the cockpit structure, a set of rollers that fits into the top rail and two other sets of rollers that fit into the bottom rail, the said sets of rollers being installed on levers, themselves articulated on the frame.

In this case, the invention is particularly suitable for the case in which there is a non-zero angle between the top rail and the bottom rail equal to not more than about 5 degrees.

Advantageously, the guide means comprise means of absorbing deformations of the window pane when it is in the closed and locked position.

According to a first embodiment, the said means capable of absorbing deformations of the window pane comprise flexible parts of the top and bottom rails located on the outside of the rails, facing each set of rollers when the window is closed.

According to a second embodiment, the means used to absorb deformations of the window pane comprise at least one compensation part articulated on the frame by a ball joint connection and supporting one of the said sets of rollers.

In this case, the compensation part preferably supports the set of rollers that fit into the top rail.

Advantageously, in the second embodiment of the invention, the set of rollers supported by the compensation part comprises two external rollers for which the spindles are fixed with respect to the said part and a central roller placed non-symmetrically between the external rollers, the spindle of the central roller being free to move with respect to the said part, the first elastic means applying forces to the spindle of the central roller in a state offset from a plane containing the spindles of the external rollers.

In this case, the compensation part preferably supports a control device mechanically connected to the spindle of the central roller such that actuating the control device provides a means of bringing the spindle of the central roller into the plane containing the spindles of the external rollers, opposing the action of the first elastic means.

According to another advantageous aspect of the invention, the locking/unlocking means are capable of immobilizing the window pane with respect to the cockpit structure regardless of the position of the said window pane (except when the front lower roller fits into the front part of the bottom rail that is curved outwards).

The locking/unlocking means then advantageously comprise a rack fixed to the bottom rail and a ratchet mechanically connected to the handle, so that it engages with the rack when the unlocking device is released, to prevent any forwards movement of the window pane with respect to the cockpit structure.

In the preferred embodiments of the invention, at least one of the sets of rollers comprises a wheel that can roll on the bottom of a first of the rails and two spherical rollers with rotation axes perpendicular to the rotation axis of the wheel, placed on each side of the wheel and capable of rolling on not more than one of the sides of the said first rail.

Advantageously, the handle then supports a pin mechanically connected to the button, and the frame is fitted with a lock in which the pin fits to fix the rotational position of the handle when the button returns to its locking position and when the handle is in contact with the window pane.

BRIEF DESCRIPTION OF THE DRAWINGS

We will now describe different preferred embodiments of the invention as illustrative and non-limitative examples, with reference to the attached drawings in which.

DETAILED PRESENTATION OF PREFERRED EMBODIMENTS

Figure 1:
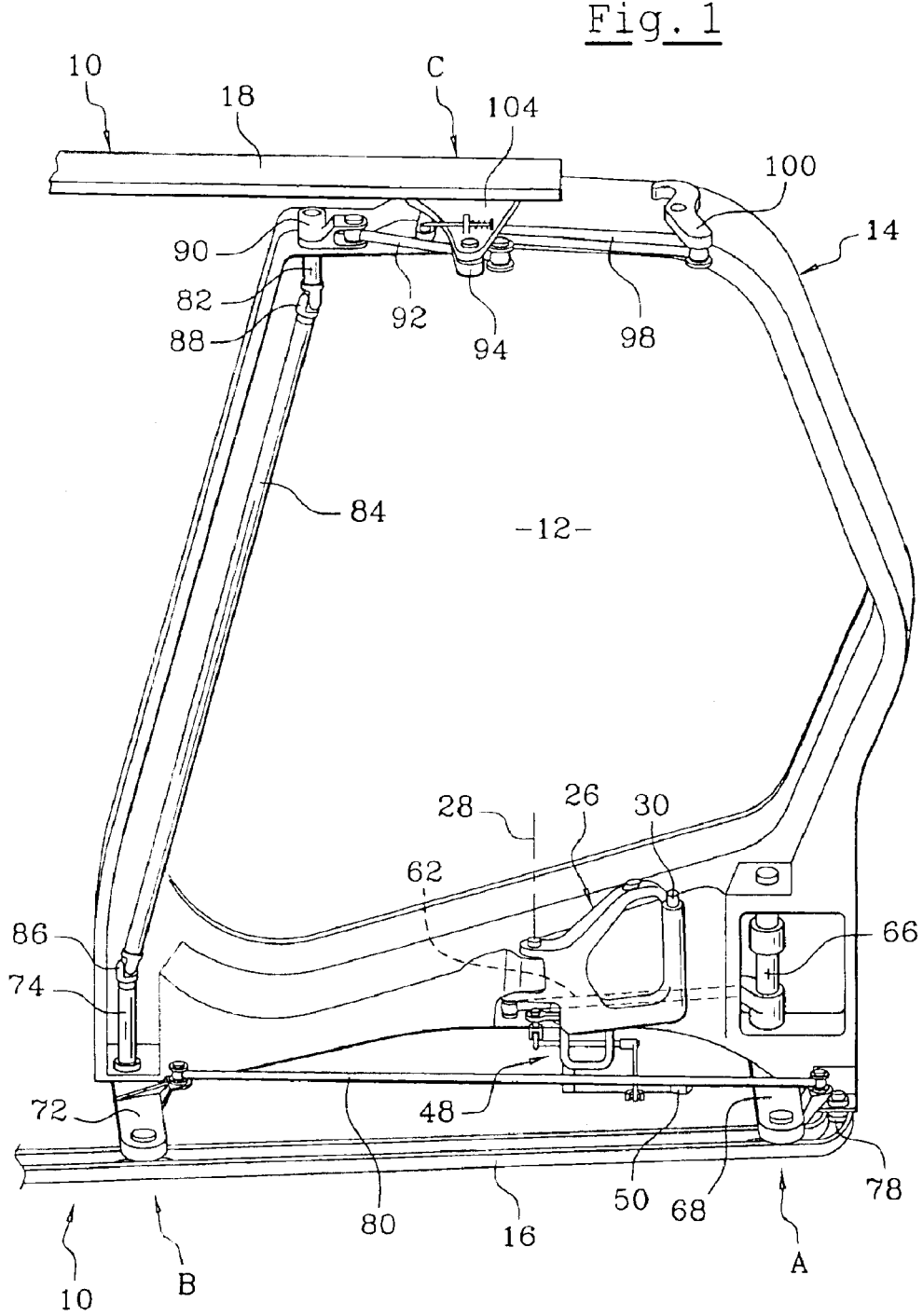
FIG. 1 is a front view of an aircraft cockpit window conform with the invention observed from inside the aircraft.

As illustrated in particular in FIG. 1, the invention relates to a side window in an aircraft cockpit. Conventionally, the window comprises a fixed frame part 10 that will be called the "cockpit structure" in the remainder of this text, and a window pane 12 provided with a rigid frame 14.

Although the invention is applicable to any type of aircraft window, it is particularly suitable for large windows with complex double curvature shapes.

The window 12 and its rigid frame 14 form a mobile assembly that can be manipulated by persons located inside the cockpit without any power assistance to open the window. The window can thus be used as an emergency exit.

Manoeuvring forces are less than 22 kg, in accordance with the regulations in force. However, the initial force at the start of the manoeuvre may for example be more than 10 kg, to prevent accidental movement. Note that the mobile assembly can be manoeuvred even in the presence of a residual pressure difference in the cockpit due to incorrect operation of the air conditioning circuit.

The mobile window assembly is designed to be air tight under the effect of the pressure in the aircraft cockpit and the external aerodynamic pressure, and also if there is no pressure difference (for example when it is raining).

The frame 14 of the window cooperates with the cockpit structure 10 through three-point guide means A, B and C. These guide means provide a statically determinate link between the frame 14 and the cockpit structure 10, while enabling the window to open by the window pane 12 sliding backwards, in other words towards the left in FIG. 1.

The guide means comprise a bottom rail 16 and a top rail 18 that form an integral part of the cockpit structure 10, and three sets of rollers 20, 22 and 24 connected to the frame 14 of the window pane 12 and materializing the three connection points A, B and C respectively. The two sets of rollers 20 and 22 fit into the bottom rail 16 and the third set of rollers 24 fits into the top rail 18. The centrelines of the rollers 20, 22 and 24 are approximately perpendicular to the bottom of the bottom and top rails.

Furthermore, as can be seen in FIG. 1, the lower edge of the frame 14 of the window pane 12 supports a roller 78 at its front end, and the vertical hinge pin of this roller is fitted directly on the said frame.

More precisely, the bottom rail 16 is provided with a rolling track that is open at the top and delimited by a bottom, and by two parallel vertical sides at a spacing greater than the diameter of the rollers in the sets of rollers 20 and 22. Similarly, the top rail 18 comprises a rolling track open at the bottom and delimited by a bottom, and by two parallel vertical sides at a spacing greater than the diameter of the rollers in the set of rollers 24.

Figure 10:
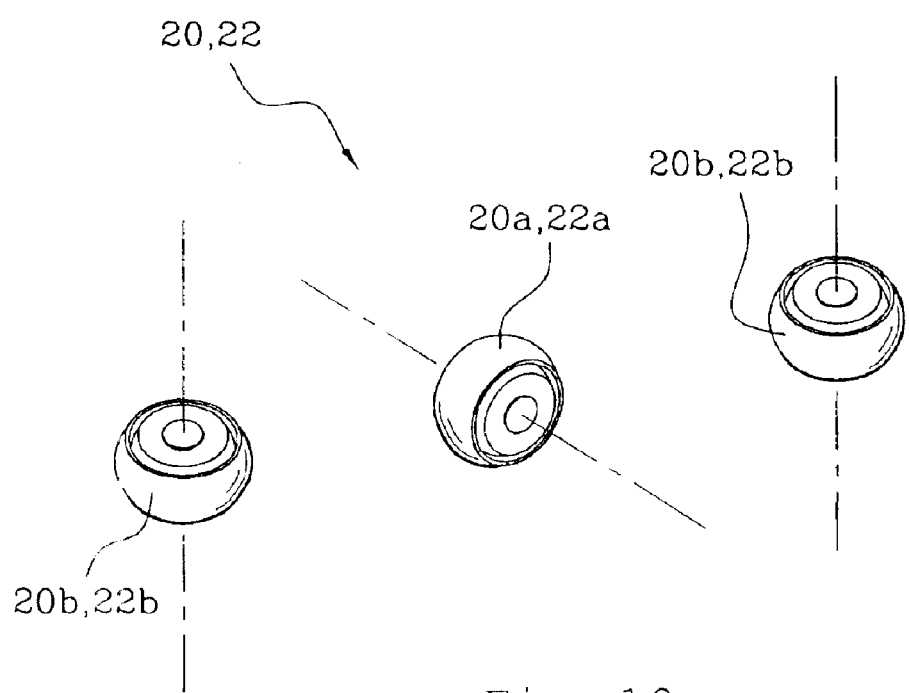
FIG. 10 is a diagrammatic view that represents one of the sets of rollers through which the window pane is supported on the bottom rail, and elements other than the rollers have been deliberately omitted.

In one advantageous embodiment of the invention illustrated diagrammatically on FIG. 10, at least one of the sets of rollers 20 and 22 through which the window pane 12 is supported on the bottom rail 16, comprises three rollers 20 and/or 22 arranged so as to form a ball joint function. Thus, the set of rollers 20 and/or 22 comprises a central wheel 20*a*, 22*a* with a spindle approximately parallel to the bottom of the rail 16 capable of rolling on the bottom of the bottom rail 16, and two spherical rollers 20*b*, 22*b* arranged on each side of the central wheel 20*a*, 22*a*. The axes of rotation of the spherical rollers 20*b* and 22*b* are arranged in a direction orthogonal to the axis of the central wheel 20*a*, 22*a*, in other words along directions approximately perpendicular to the bottom of the rail 16. The spherical rollers 20*b*, 22*b* are thus capable of rolling on not more than one of the sides of the bottom rail 16.

According to one aspect of the invention, the rails 16 and 18 are not necessarily parallel. Thus, these rails are contained in two parallel planes, although the planes may have an angle between them that is not equal to zero and is less than or equal to about 10 degrees, and preferably 5 degrees.

As shown also in FIG. 1, the rolling track formed in the bottom rail 16 is straight over most of its length. However, this rolling track comprises a front end that is curved towards the outside of the aircraft at approximately 90 degrees.

When the window is closed as illustrated in FIG. 1, the roller 78 is placed at the front end of the groove formed in the bottom rail 16.

Advantageously, the guide means of the frame 14 with respect to the cockpit structure 10 comprise means of absorbing deformations of the mobile structure, in other words the window pane 12, with respect to the fixed structure 10 of the cockpit. These means are designed to minimize stresses applied to rails 16 and 18, to prevent fatigue of these rails that could cause the development of cracks, etc., particularly when the aircraft cockpit is being pressurised which tends to crush the window pane 12 and its frame 14 onto the fixed structure 10.

According to a first embodiment, these means capable of absorbing deformations of the window pane 12 include flexible parts of the bottom rail 16 and the top rail 18 located facing each of the three sets of rollers 20, 22 and 24 when the window is closed as illustrated in FIG. 1. In particular, these flexible parts can be made from a material with elasticity characteristics higher than the characteristics of the material from which most of each of the rails is made (the rail is usually made from a metal such as aluminium). Thus, in particular, the flexible parts of the rails may be made from an elastomer.

The window shown in FIG. 1 also comprises means of locking unlocking the frame 14 with respect to the cockpit structure 10, and the control device for controlling displacement of the window pane 12 with respect to the cockpit structure 10 when the locking unlocking means are in an unlocked state.

In the preferred embodiment of the invention illustrated in FIG. 1, the control device is materialised by a handle 26 articulated on the lower upright of the frame 14 about an axis 28 that is preferably approximately vertical. More precisely, the articulation axis 28 is located in the central part of the frame 14, on the face of the said upright facing inside the cockpit. When the window is closed and locked, the handle 26 is folded down towards the front of the aircraft so that it is in contact with the window pane as illustrated in FIGS. 1 and 2.

Figure 2:
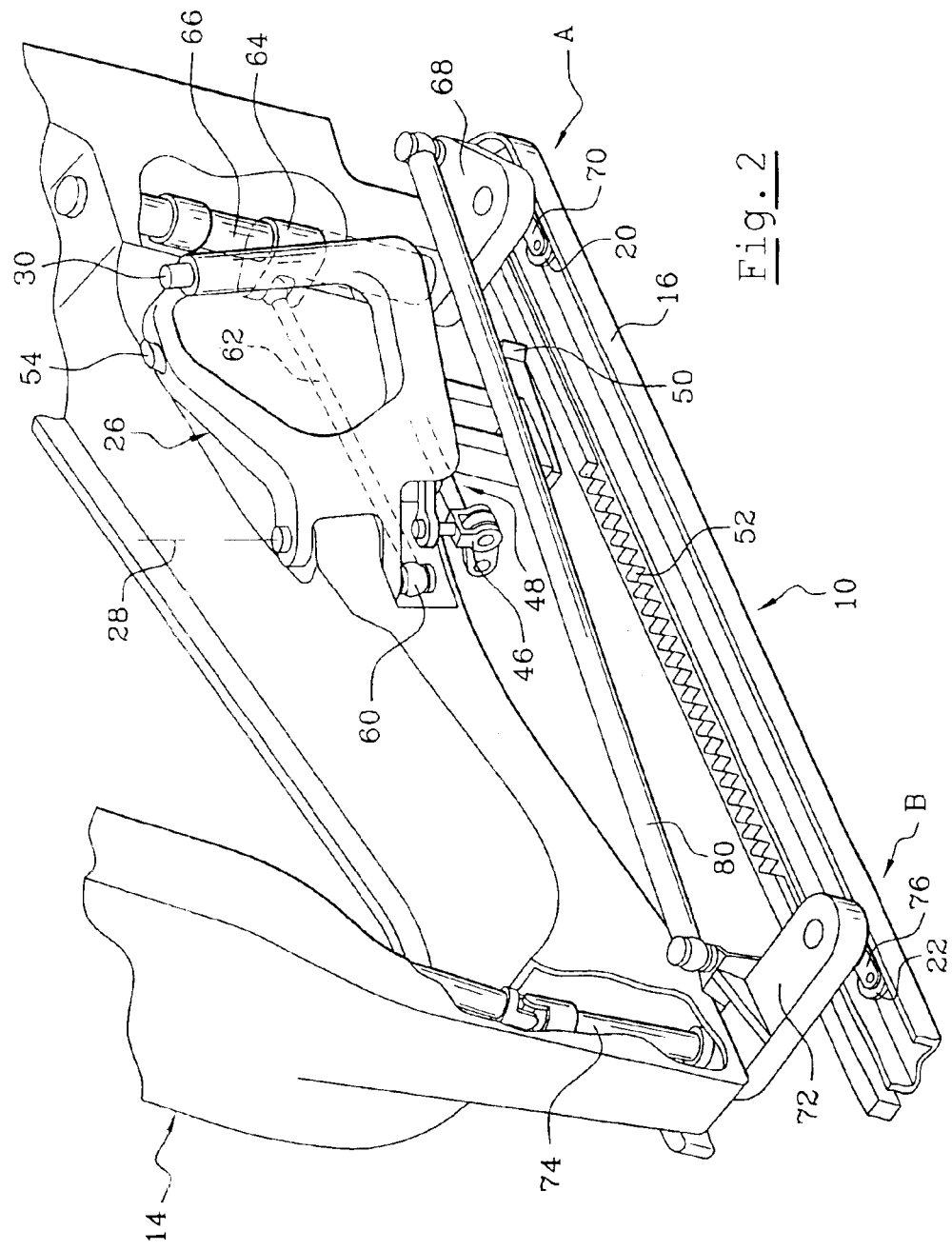
FIG. 2 is a perspective view that shows the bottom part of the window in FIG. 1 at a larger scale, also observed from inside the aircraft.
Figure 4:
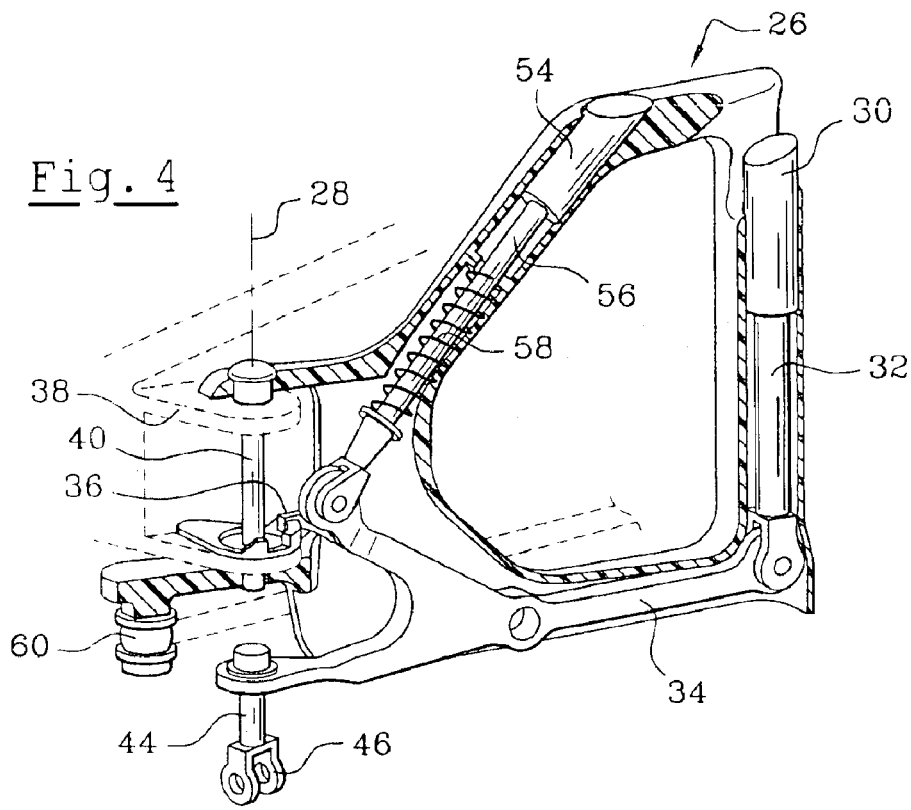
FIG. 4 is a perspective tear off view that shows the articulated handle at a larger scale materializing the control device for the window in FIG. 1, illustrated in its folded locking position.
Figure 5:
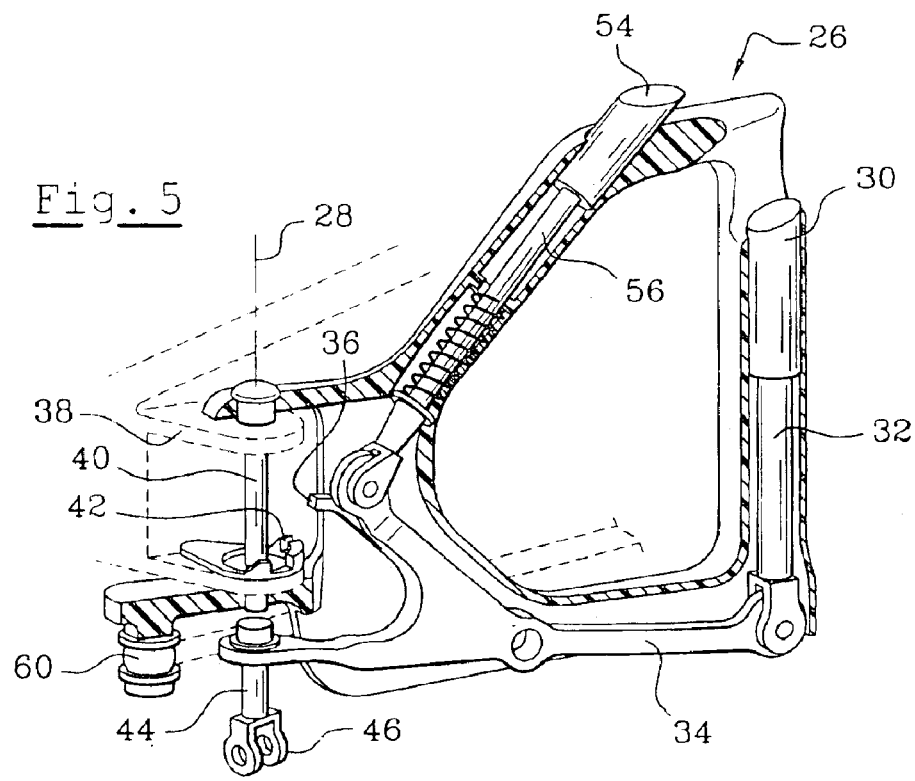
FIG. 5 is a view similar to FIG. 4, showing the handle in its unlocking position.

According to the invention, and as shown in particular in FIGS. 2, 4 and 5, the locking/unlocking means comprise an unlocking device supported by the handle 26 and in the preferred embodiment of the invention, materialised by a button 30. When the handle 26 is in contact with the window pane as illustrated in FIGS. 2 and 4, the button 30 projects on the handle 26 so that an operator who grips the handle can easily push it with his thumb.

FIGS. 4 and 5 show the handle 26 without its outside cladding, in its locked state and in its unlocked state respectively. The positions occupied by the mechanism contained in the handle in each of these two states can be seen clearly.

The pivoting axis 28 of the handle 26 is materialised by a clevis 38 fixed to the lower branch of the frame 14 and by a journal 40 fixed to the handle 26 free to turn in the clevis 38.

In the embodiment shown, the button 30 is composed of the top end of a rod 32 that fits free to slide into an approximately vertical branch of the handle 26, away from the pivot axis 28. At its lower end, the rod 32 is articulated onto the end of one of the arms of a three-arm lever 34, installed free to pivot about its central part in a lower branch of the handle 26.

The end of another arm of the lever 34 supports a pin 36 that occupies a low position (FIG. 4) if the button 30 is projecting from the handle 26, or a high position (FIG. 5) if it is not projecting. The pin 36 is located close to the pivot axis 28 of the handle 26, immediately above a lower plate of the clevis 38.

The top face of the lower plate of the clevis 38 comprises a lock 42, in the part located facing the pin 36. When it is in the down position (FIG. 4), the pin 36 penetrates the lock 42 which has the effect of fixing the handle 26 in rotation. On the other hand, when the pin 36 is in the high position (FIG. 5), it is released from the lock 42 and enables the handle 26 to pivot about its axis 28, which provokes movement and therefore opening of the window.

The third arm of the lever 34 is provided with an approximately vertical rod 44 at its end fitted with a clevis 46 at its bottom end. This clevis 46 is engaged on a mechanism 48 connected to a ratchet 50 at its opposite end. The ratchet 50 is located facing a rack 52 fixed to the bottom rail 16 and oriented parallel to this rail.

More precisely, the mechanism 48 is designed such that a displacement of the clevis 46 in the upwards or downwards direction caused by penetration or release of the button 30 will disengage or engage the ratchet 50 on the rack 52.

When the ratchet 50 is engaged on the rack 52, in other words when the button 30 is released, any relative displacement of the window pane 12 towards the forward end (in other words towards the right in FIG. 1) with respect to the fixed structure 10 is prevented. On the other end, the window pane 12 may move backwards freely. This arrangement avoids the possibility of injury to a person leaning out through the window if braking of the aircraft makes the window move forwards.

As illustrated more precisely in FIGS. 4 and 5, the handle 26 is provided with a device 54 indicating if the window pane 12 is not locked. More precisely, the device 54 is fixed to the end of a rod 56 installed free to slide in an inclined forward branch of the handle 26. At its opposite end, the rod 56 is articulated to the end of the arm of the lever 34 on which the pin 36 is fitted.

Thus, when the button 30 is in the locking position of the window illustrated in FIG. 4, the indicator device 54 is fully retracted inside the handle 26. And on the other hand, when the button 30 is pushed into the unlocking position of the window illustrated in FIG. 5, the indicator device 54 projects outside the handle to inform operators that the window is not locked.

The indicator device 54 may advantageously be coloured, for example red, to improve its efficiency.

As illustrated in FIGS. 4 and 5, the mechanism for which the displacement is controlled by the button 30 includes a return spring 58 arranged such that the button 30 normally projects on the handle when it is not activated by an operator. In the embodiment illustrated in the figures, the return spring 58 is placed around the rod 56 in the inclined front branch of the handle 26 and is supported at its ends on a shoulder formed inside the said branch and on a shoulder formed on the rod 56 close to the pin 36.

As illustrated particularly in FIGS. 2, 4 and 5, the handle 26 comprises a horizontal arm fitted with a vertical pivot 60 on the side of the pivot axis 28 opposite the branch in which the button 30 is fitted. One end of a connecting rod 62 is articulated on this pivot 60. The other end of the connecting rod 62 is articulated on a lever 64 fixed to an approximately vertical axis 66 installed free to rotate in the front upright of the frame 14 of the window pane 12. The articulation axis of the connecting rod 62 on the lever 64 is offset towards the outside of the aircraft from the hinge pin 66.

A second lever 68 is fixed to the hinge pin 66, just above the bottom rail 16. A first carriage 70 on which the first set of rollers 20 is fitted free to pivot on the lower face of the second lever 68, through an approximately vertical axis offset towards the inside of the aircraft from the hinge pin 66.

In its lower part, the rear edge of the frame 14 of the window pane 12 supports an approximately vertical hinge pin 74 and is free to pivot about this hinge pin. A third lever 72 is fixed to this hinge pin 74 in the immediate vicinity of the bottom rail 16. A second carriage 76 supporting the second set of rollers 22 is installed free to pivot on the lower face of the third lever 72, about an approximately vertical axis offset towards the inside of the aircraft from the hinge pin 74.

A connecting rod 80 is articulated between levers 68 and 72, at locations offset towards the inside of the aircraft from their hinge pins 66 and 74. The function of this connecting rod 80 is to make the lever 72 pivot in the same direction as the lever 68 when the hinge pin 66 is driven in rotation by the connecting rod 62, under the effect of pivoting of the handle 26.

Figure 3:
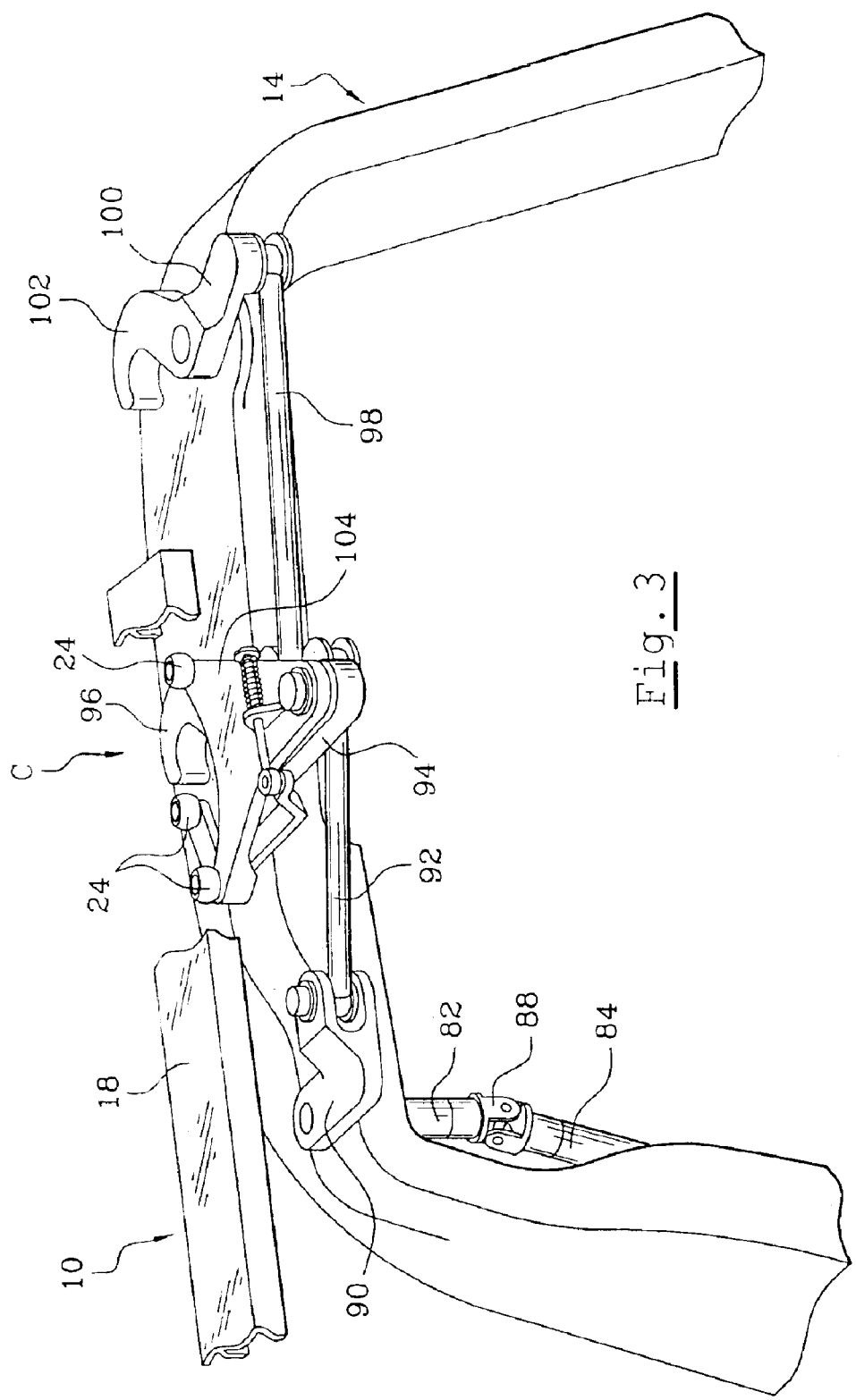
FIG. 3 is a perspective view similar to FIG. 2, that shows the top part of the window at larger scale, observed from inside the aircraft.

As illustrated particularly in FIGS. 1 and 3, the hinge pin 74 supporting the lever 72 is connected in rotation to an approximately vertical hinge pin 82 free to rotate at the rear end of the top upright of the frame 14 of the window pane 12. This connection in rotation is made by a shaft 84 running along the rear upright of the frame 14, the top and bottom ends of which are engaged on the top end of the hinge pin 74 and the bottom end of the hinge pin 82 by universal joints 86 and 88.

Above the top upright of the frame 14, the hinge pin 82 is fixed to a fourth lever 90 oriented approximately at a right angle from the corresponding rail facing inwards into the aircraft, like levers 68 and 72, when the handle is folded forwards and down in contact with the window pane 12 as illustrated in FIG. 1. A first end of a connecting rod 92 is articulated at the end of the fourth lever 90. The connecting rod 92 runs along the rear part of the top upright of the frame 14.

As illustrated more precisely in FIG. 3, the other end of the connecting rod 92 is articulated to the end of a fifth lever 94 installed free to pivot on the top upright of the frame 14, approximately in the middle of the frame, through an approximately vertical axis not shown in the figures. Like the levers 68, 72 and 90, the lever 94 is facing towards the inside of the aircraft and is oriented at approximately 90° from the top rail 18 when the handle 26 is pushed in contact with the window pane 12.

The lever 94 forms a hook 96 at the end of the connecting rod 92 opposite its pivot axis. This hook 96 is positioned between the top rail 18 and the top upright of the frame 14. It is designed to be engaged on a pin (not shown) projecting downwards from the fixed structure 10 of the cockpit when the window is closed and the handle 26 is pushed in contact with the window pane 12.

A first end of a connecting rod 98 is articulated on the lever 94 close to the articulation hinge pin of the connecting rod 92 on the said lever. This connecting rod 98 runs along the front part of the top upright of the frame 14. Its front end is articulated at the end of a fifth lever 100, mounted free to pivot on the front end of the top upright of the frame 14. Like the other levers described above, the lever 100 is facing inwards into the aircraft and is oriented at approximately 90° from the top rail 18 when the handle 26 is pushed in contact with the window 12.

The lever 100 forms a hook 102 at the end of the connecting rod 98 opposite to its pivot hinge pin. This hook 102 is positioned between the top rail 18 and the top upright of the frame 14. It is designed to be engaged on a pin (not shown) projecting downwards from the fixed structure 10 of the cockpit when the window is closed and the handle 26 is pushed in contact with the window pane 12.

Figure 6:
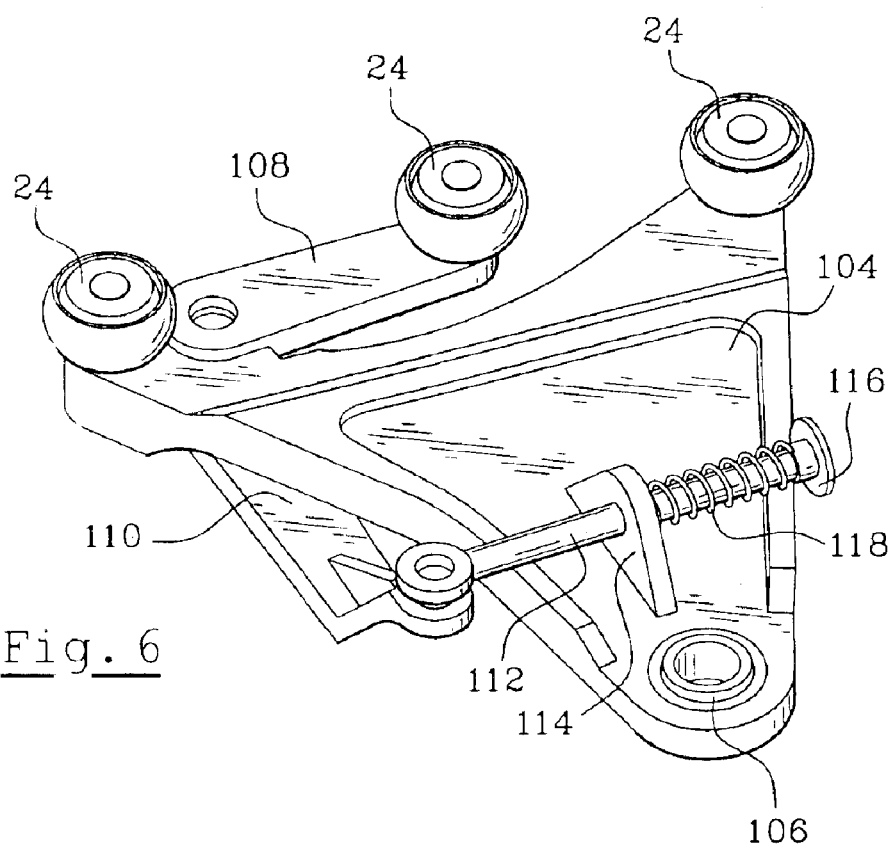
FIG. 6 is a perspective view looking from above that illustrates a first embodiment of a compensation triangle inserted between the window frame and the top rail.

As shown in FIGS. 3 and 6, in the embodiment shown on the figures, the set of rollers 24 is supported by an approximately triangular plate called the "compensation part" 104. More precisely, the compensation part 104 is installed on the lever 94 and is articulated to it through a ball joint 106 fitted at the end of the said lever. The compensation part 104 is usually approximately horizontal and is installed on the ball joint 106 through one of the vertices of the triangle formed by the said part. Two of the rollers 24 are fitted at the other two vertices of this triangle on approximately vertical hinge pins.

A third roller 24 is installed at the end of a lever 108 installed free to pivot on the compensation part 104 close to one of the other two rollers 24 through an approximately vertical axis. The length and orientation of the lever 108 are such that the two rollers 24 supported directly by the compensation part 104 are arranged non-symmetrically with respect to the third roller 24 installed on the lever 108.

Note that the use of at least one compensation part such as the part 104 forms an alternative to the use of flexible parts on rails 16 and 18 facing the three sets of rollers 20, 22 and 24 when the window is closed. This type of compensation part associated with at least one of the said sets of rollers forms a means capable of absorbing deformations of the window pane 12, in the same way as the flexible parts of the rails. This arrangement provides a means of assuring that the deformations of the window pane 12 can be absorbed by guaranteeing contact of at least one of the rollers such as 24 on each side of the corresponding rail 16 or 18.

In the embodiment illustrated in FIG. 6, a lever 110 is fixed to the hinge pin supporting the lever 108 below the compensation part 104. This lever forms approximately a right angle with the lever 108 and a rod 112 is articulated at its end. The rod 112 passes through an opening formed in a lug 114 fixed to the top face of the compensation part 104, close to the ball joint 106, the rod 112 is terminated by a collar 116 at its end. A helical compression spring 118 is wound around the rod 112 such that its ends bear on the lug 114 and the collar 116 respectively.

The arrangement that has just been described provides a means of pushing the intermediate roller 24 towards the outside of the aircraft, so that it is not in line with the other two rollers 24. Thus, when the rollers 24 fit into the rolling track of the top rail 18, the intermediate roller 24 normally bears on the side of this track facing the outside of the aircraft, while the other two rollers 24 normally bear on the side of this track facing the inside of the aircraft.

Note also that the arrangement described above provides a means of manually releasing the rollers 24 from the top rail 18 by applying pressure on the collar 116 formed at the end of the rod 112. This operation provides a means of bringing the three rollers 24 into line and pivoting the compensation part 104 downwards around the ball joint 106, so that the rollers 24 come out of the rolling track defined by the top rail 18.

Figure 7:
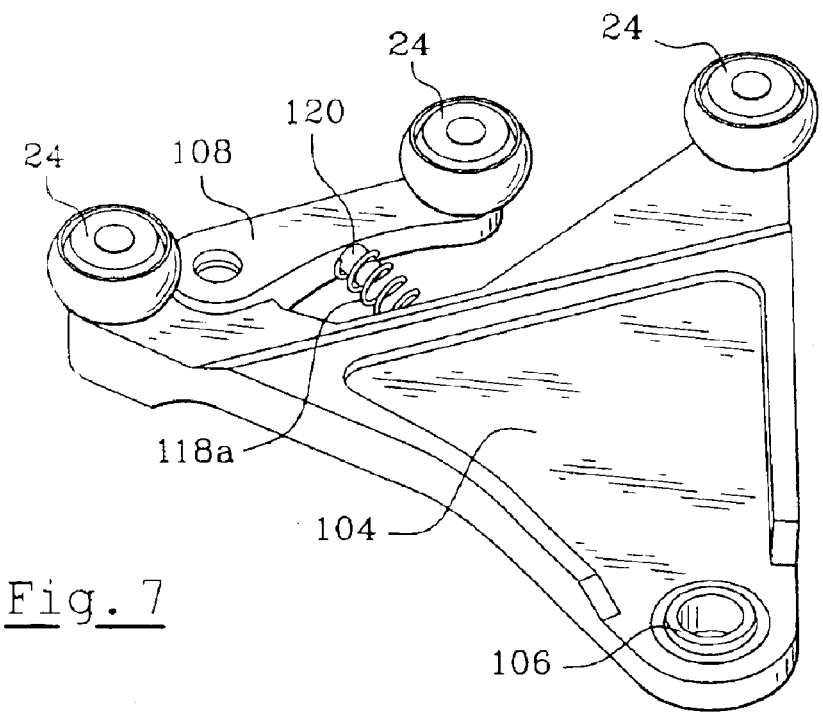
FIG. 7 is a view comparable to FIG. 6 that illustrates a second embodiment of the compensation triangle.

FIG. 7 illustrates another embodiment in which the lever 110, the rod 112, the lug 114 and the spring 118 are eliminated. In this case, a helical compression spring 118a is inserted directly between the edges facing the lever 108 and the compensation part 104. The spring 118a is held in place by projections such as projections 120 formed on the said edges and on which the ends of the spring are engaged.

Figure 8:
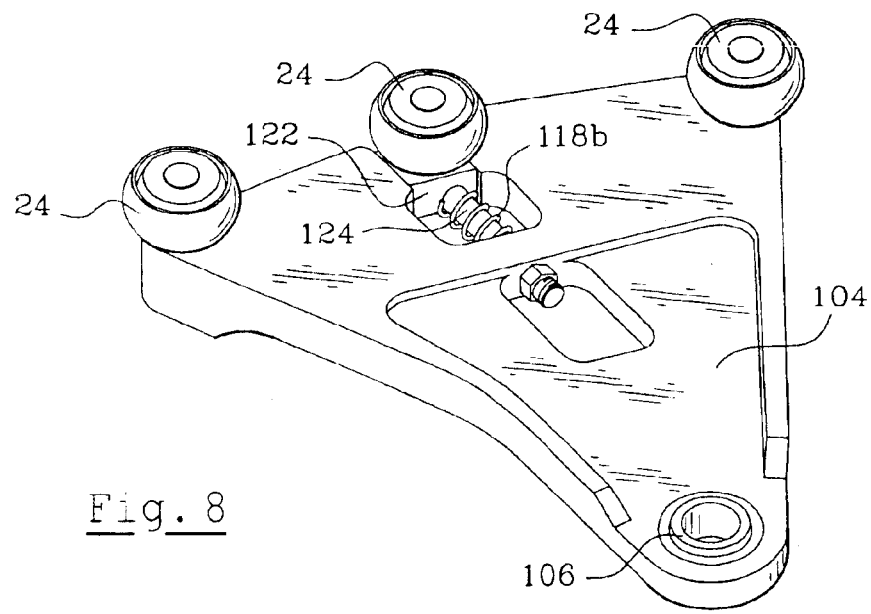
FIG. 8 is a view comparable to FIGS. 6 and 7 that illustrates a third embodiment of the compensation triangle.

FIG. 8 illustrates yet another embodiment of the invention, in which the intermediate roller 24 is installed on a slide 122 that fits into a notch provided for it in the edge of the compensation part 104 facing the outside of the aircraft, between the other two rollers 24. The slide 112 is installed on a guide rod 124 fixed to the compensation part 104. A helical compression spring 118b is installed around the rod 124 such that its ends bear on the slide 122 and on the compensation part 104 respectively.

Figure 9:
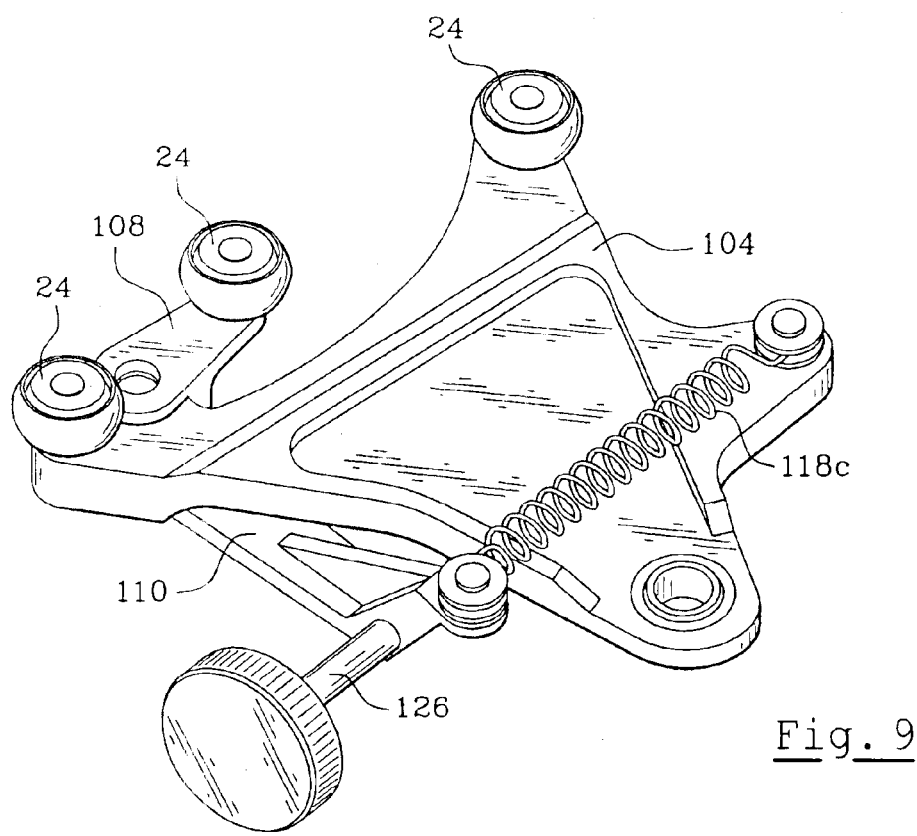
FIG. 9 is a view comparable to FIGS. 6 to 8, that illustrates a fourth embodiment of the compensation triangle.

The pivoting levers 108 and 110 in FIG. 6 are also used in yet another embodiment of the invention illustrated in FIG. 9. However, the rod 112 and the compression spring 118 are deleted and replaced by a helical tension spring 118c, the ends of which are attached to the end of the lever 110 and to the compensation part 104 respectively, such that the spring 118c is oriented approximately perpendicular to the lever 110.

A screw 126 on which a knurled head is formed is screwed into the lever 110, such that its end is free to come into contact with one edge of the compensation part 104 adjacent to this lever 110. The screw 126 can be tightened manually to pivot the lever 110 against the force applied by the spring 118c, to bring the intermediate roller 24 into line with the other two rollers 24, when it is required to remove the window pane.

We will now describe how to open the window, with reference to the appended drawings.

When the window is closed, the levers 68 and 72 practically form right angles with the bottom rail 16 and the levers 90, 94 and 100 practically form right angles with the top rail 18. Furthermore, the roller 78 is housed in the front end, curved towards the outside of the aircraft, from the rolling track of the bottom rail 16. Consequently, the window pane 12 with its rigid frame 14 is offset as far as possible towards the outside of the aircraft. The closing seal can then be provided by appropriate means (not shown) inserted between the frame 14 and the cockpit structure.

When the operator presses the button 30 on the handle 26, the effect is to release the pin 36 from the lock 42 and bring the ratchet 50 into a position in which it is no longer engaged on the rack 52. This enables firstly the handle to pivot backwards and secondly the window pane 12 to move in either direction.

The operator then pivots the handle 26 backwards, which has the effect firstly of moving the window pane 12 towards the inside of the aircraft, due to the shape of the front end of the rolling track of the bottom rail 16 in which the roller 78 fits, and subsequently simultaneous pivoting of levers 68, 72, 90, 94 and 100 controlled by the mechanism including particularly the different connecting rods 62, 80, 92 and 98 and the hinge pins 66, 74, 84 and 82.

Note that this preliminary phase for displacement of the window pane 12 and its frame 14 is accompanied by a release of hooks 96 and 102 from the complementary pins (not shown) provided on the fixed structure 10 of the cockpit.

When this first displacement phase is finished, the handle 26 makes approximately a right angle with the window pane 12. The window pane is then displaced on the rails 16 and 18 linearly towards the back of the aircraft.

Note that if the window is then held in the open position simply by releasing the button 30, the ratchet 50 then returns and is engaged on the rack 52. Therefore, it is impossible for the window pane 12 to move forwards, which prevents an accident to a person leaning out of the window while the aircraft is braking. However, the window can always be opened further by moving the window pane 12 further backwards.

It is possible to move the window pane 12 and its frame 14 towards the back of the aircraft, despite the possibly complex and non-developable shape of the window pane 12 and if the rails 16 and 18 are not parallel, since the connection between the frame 14 and the rails 16, 18 is statically determinate and due to the presence of the compensation part 104 connected to the lever 94 through a ball joint 106.

The compensation part 104 thus materializes means capable of absorbing possibly non-homogenous deformations of the window pane 12 on the surface of the window pane, due to phenomena such as a pressure differential between the inner and outer faces or such as temperature variations, etc.

User controls are very ergonomic since all controls (lock the window pane, open the window pane, lock the window pane in the open or semi-open position) are grouped on the handle 26. Ergonomy is even more improved by orienting the centreline of the handle along an approximately vertical direction as is shown.

Obviously, the invention is not limited to the embodiments that have just been described as examples.

What is claimed is:

1. An aircraft window, comprising:
 a cockpit structure,
 a window pane provided with a rigid frame,
 three-point guide means for guiding the frame with respect to the cockpit structure,
 a means of locking/unlocking the frame with respect to the cockpit structure, and
 a control device to control displacement of the window cane with respect to the cockpit structure when the locking/unlocking means are in an unlocked state,
 wherein the locking/unlocking means comprises an unlocking device supported on the control device and the locking/unlocking means are capable of immobilizing the window pane with respect to the cockpit structure regardless of the position of the said window pane.

2. Window according to claim 1, in which the control device is a handle articulated on the frame and the unlocking device is a button placed on the handle and elastically returned to a locking position.

3. Window according to claim 2, in which the handle is articulated on the frame about an approximately vertical hinge pin.

4. Window according to claim 2, in which the handle is free to pivot backwards on the rigid frame starting from a position in contact with the window pane.

5. Window according to claim 2, in which an unlocking indicator device is placed on the handle, the said device being mechanically connected to the button so that it projects outwards on the handle and is clearly visible when the button is in an unlocking position.

6. Window according to claim 1, in which the guide means comprise a top rail and a bottom rail belonging to the cockpit structure, a set of rollers that fits into the top rail and two other sets of rollers that fit into the bottom rail, the said sets of rollers being installed on the frame.

7. Window according to claim 6, in which there is a non-zero angle between the top rail and the bottom rail equal to not more than about 5 degrees.

8. Window according to claim 6, in which the guide means comprise means of absorbing deformations of the window pane.

9. Window according to claim 8, in which the means capable of absorbing deformations of the window pane comprise flexible parts of the top and bottom rails located facing each set of rollers when the window is closed.

10. Window according to claim 8, in which the means used to absorb deformations of the window pane comprise at least one compensation part articulated on the frame by a ball joint connection and supporting one of the said sets of rollers.

11. Window according to claim 10, in which the compensation part supports the set of rollers that fit into the top rail.

12. Window according to claim 10, in which the set of rollers supported by the compensation part comprises two external rollers for which the spindles are fixed with respect to the said part and a central roller placed non-symmetrically between the external rollers, the spindle of the central roller being free to move with respect to the said part, the first elastic means applying forces to the spindle of the central roller in a state offset from a plane containing the spindles of the external rollers.

13. Window according to claim 12, in which the compensation part supports a control device mechanically connected to the spindle of the central roller such that actuating the control device provides a means of bringing the spindle of the central roller into the plane containing the spindles of the external rollers, opposing the action of the first elastic means.

14. Window according to claim 1, in which the locking/unlocking means then comprise a rack fixed to the bottom rail and a ratchet mechanically connected to the handle, so that it engages with the rack when the unlocking device is released, to prevent any forwards movement of the window pane with respect to the cockpit structure.

15. Window according to claim 6, in which at least one of the sets of rollers comprises a wheel that can roll on the bottom of a first of the rails and two spherical rollers with rotation axes perpendicular to the rotation axis of the wheel, placed on each side of the wheel and capable of rolling on not more than one of the sides of the said first rail.

16. An aircraft window, comprising:
a cockpit structure,
a window pane provided with a rigid frame fitted with a lock,
a three-point guide means for guiding the frame with respect to the cockpit structure,
means of locking/unlocking the frame with respect to the cockpit structure,
a control device to control displacement of the window cane with respect to the cockpit structure when the locking/unlocking means are in an unlocked state,
wherein the locking/unlocking means comprises an unlocking device supported on the control device and the control device supports a pin mechanically connected to the locking device, such that the pin fits in the lock to fix the rotational position of the control device when the locking device returns to its locking position and when the control device is in contact with the window pane.

* * * * *